July 21, 1953 A. HAZELTINE 2,646,526

SYSTEM FOR GENERATING SCANNING CURRENTS

Filed March 8, 1952 2 Sheets-Sheet 1

INVENTOR.
ALAN HAZELTINE
BY Laurence B. Dodds
ATTORNEY

July 21, 1953 A. HAZELTINE 2,646,526

SYSTEM FOR GENERATING SCANNING CURRENTS

Filed March 8, 1952 2 Sheets-Sheet 2

INVENTOR.
ALAN HAZELTINE
BY Laurence B. Dodds
ATTORNEY

Patented July 21, 1953

2,646,526

UNITED STATES PATENT OFFICE 2,646,526

SYSTEM FOR GENERATING SCANNING CURRENTS

Alan Hazeltine, Maplewood, N. J., assignor to Hazeltine Research, Inc., Chicago, Ill., a corporation of Illinois Application March 8, 1952, Serial No. 275,602

15 Claims. (Cl. 315—20)

GENERAL

Figure 1:
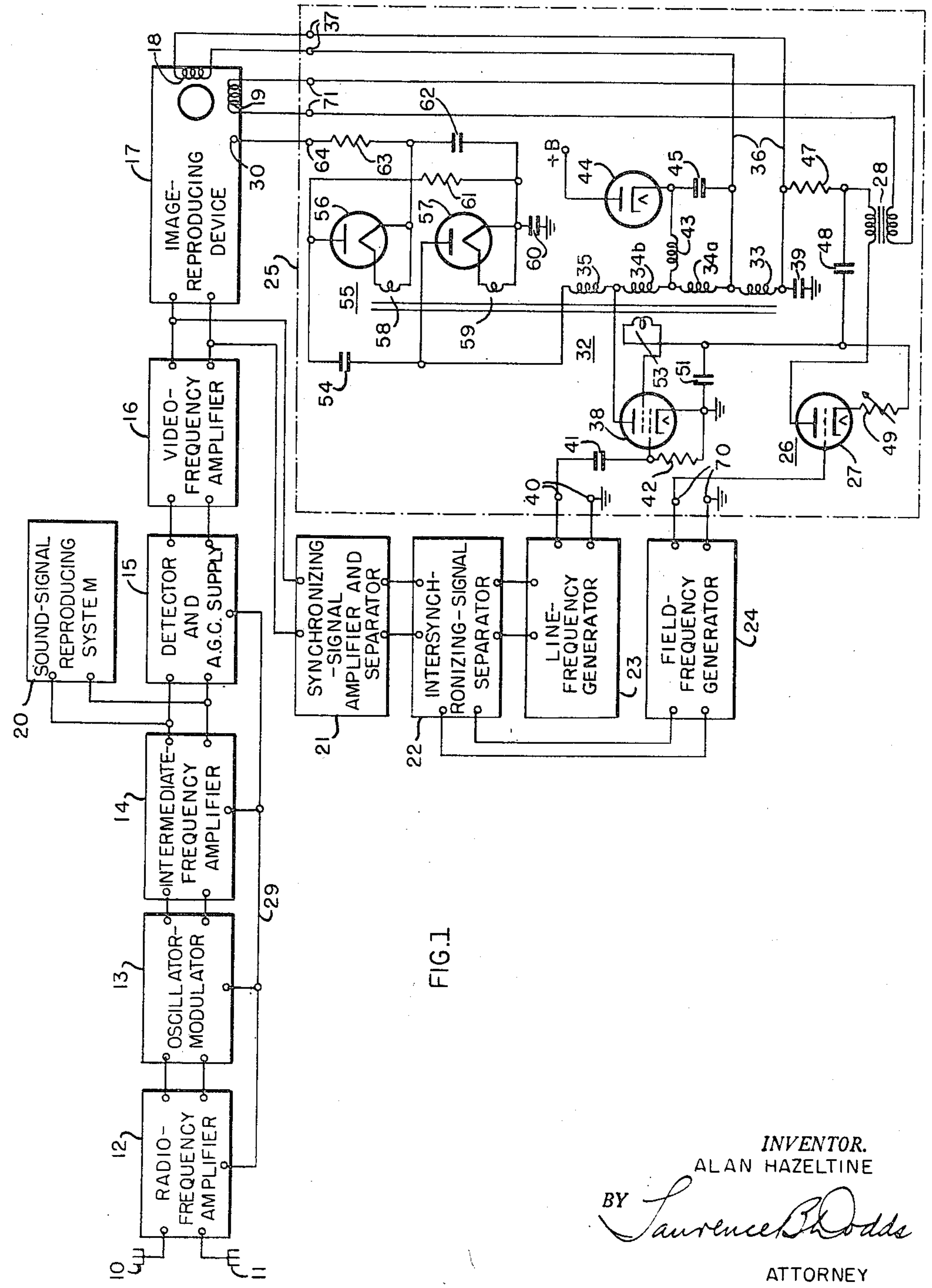

This invention relates to systems for generating periodic scanning currents for a scanning winding of a cathode-ray tube. While the invention is of general application, it has particular utility as a scanning current generating system for a television receiver. The invention is especially useful in the line-frequency scanning circuit of a television receiver and, accordingly, will be described in that environment.

In a television receiver which utilizes magnetic deflection of the electron beam of the cathode-ray display tube thereof, it is customary to pass through the line-scanning winding thereof a current of saw-tooth wave form having relatively long trace intervals and relatively short retrace intervals. A generator which develops a periodic voltage applies the latter to the input circuit of an amplifier that is capable of delivering relatively large amounts of energy to a load circuit which includes an output transformer and the line-scanning winding of the cathode-ray tube. The foregoing generator is usually referred to in the television art as a "driver stage" for the amplifier, the latter ordinarily being designated as the line-scanning amplifier. This amplifier customarily employs a screen-grid type of tube, such as a tetrode, because of its high mu, its low control electrode-anode capacitance, and its large power-handling capability. The load circuit of the line-scanning amplifier is essentially inductive and includes the usual "efficiency" or "damping" diode for providing a path of reverse-current flow and for developing a unidirectional potential for use by other circuits of the receiver. Another unidirectional potential from a source independent of the potential developed by the efficiency diode associated with the amplifier load circuit is applied to the screen electrode. A second diode, or a pair of diodes coupled to the load circuit of the amplifier by a step-up winding of the output transformer, may be utilized in the well-known manner to derive a high unidirectional voltage for application to an anode of the cathode-ray tube.

Although line-frequency scanning circuits of the type just described have been very satisfactory and have been widely used in television receivers, they are subject to certain disadvantages presently to be mentioned. The occurrence of a short circuit in the above-mentioned output transformer or in the scanning yoke, or the complete or partial loss of the signal supplied by the driver stage to the line-scanning amplifier results in excessive power dissipation at the anode of the amplifier tube just mentioned. This large anode dissipation ordinarily causes the ultimate destruction of the line-scanning amplifier tube. While this in itself is undesirable, under some circumstances much more serious trouble may result, namely, a fire which is capable of doing extensive damage to the television receiver and possibly to the dwelling or establishment in which the receiver is operating.

It is customary to reduce the hazards just mentioned by employing cathode bias in the amplifier tube. However, this expedient is only partially effective because the magnitude of the cathode resistance required to lower the anode dissipation to a permissible continuous value would introduce a prohibitive loss during usual operation. Consequently a smaller cathode resistance is used and it suffices to protect the tube merely against momentary abnormal conditions, the anode dissipation then being of the order of three times its permissible continuous value.

An effective protective system for the line-scanning amplifier tube of a television receiver is disclosed in a copending application of Rinaldo E. DeCola, Serial No. 162,589, filed May 17, 1950, and entitled "Periodic-Wave Generator," but that system is applicable only to scanning systems employing a two-winding transformer in place of the customary and much more efficient and economical autotransformer.

It is an object of the present invention, therefore, to provide a new and improved system for generating a scanning current for a scanning winding of a cathode-ray tube, which system avoids one or more of the above-mentioned disadvantages of prior such systems.

It is another object of the invention to provide a new and improved system for generating a scanning current for a scanning winding of a cathode-ray tube, which system is self-protecting in the event of abnormal conditions affecting the operation thereof.

It is a further object of the invention to provide a system for generating a scanning current for a scanning winding of a television receiver, which system employs an output autotransformer and is self-protecting in the event of abnormal conditions affecting the operation thereof.

It is a still further object of the invention to provide in a television receiver a system for generating a scanning current, which system has a self-protecting feature and yet is compact and relatively inexpensive to manufacture and is economical of power.

In accordance with a particular form of the invention, a system for generating a periodic scanning current for a scanning winding of a cathode-ray tube comprises an essentially inductive load circuit including an autotransformer having a continuous winding comprising a plurality of winding portions and including a circuit for coupling the scanning winding to at least one of said winding portions. The system also includes an electron-discharge device having input electrodes, output electrodes effectively coupled to the aforesaid load circuit, and an electrode intermediate the output electrodes. The system further includes a circuit for applying to the input electrodes a periodic voltage to develop the scanning current in the scanning winding when it is coupled to the load circuit, and a unidirectional voltage source coupled to the output electrodes through at least some of the winding portions. The generating system additionally includes a voltage-generating circuit including the aforesaid source, a rectifier device, and at least some of the winding portions for developing during normal operation of the system a unidirectional voltage substantially higher than that of the source, and a circuit connecting the voltage-generating circuit to the aforesaid intermediate electrode for applying thereto a portion of the developed voltage representative of the normal voltage of the intermediate electrode, whereby, upon failure of the system to generate a normal scanning current, the voltage of the intermediate electrode drops to an abnormally low value.

For a better understanding of the present invention, together with other and further objects thereof, reference is had to the following description taken in connection with the accompanying drawings, and its scope will be pointed out in the appended claims.

Figure 2:
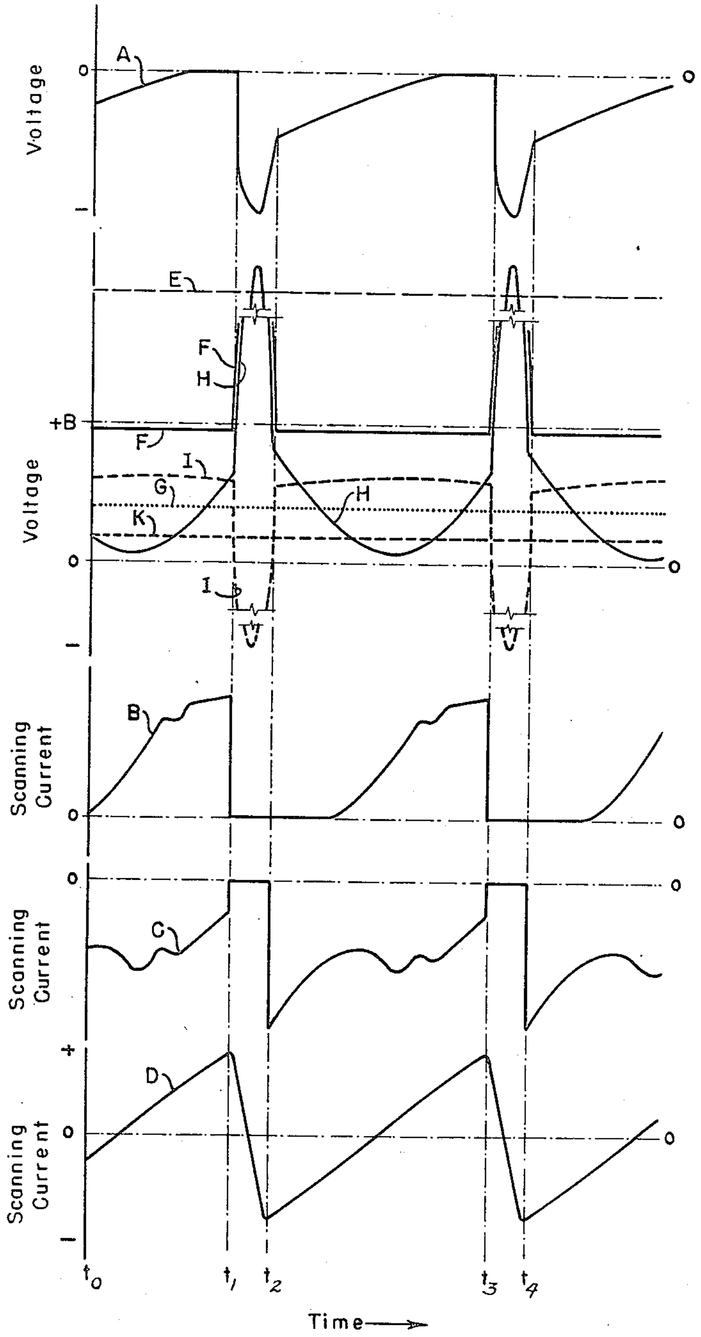

In the accompanying drawings, Fig. 1 is a circuit diagram, partly schematic, of a complete television receiver including a system for generating a scanning current for a scanning winding of a cathode-ray tube in accordance with a particular form of the present invention; and Fig. 2 is a graph utilized in explaining the operation of the generating system of the Fig. 1 receiver.

Referring now more particularly to Fig. 1 of the drawings, the television receiver there represented comprises a receiver of the superheterodyne type including an antenna system 10, 11 coupled to a radio-frequency amplifier 12 of one or more stages. There is coupled to the latter unit in cascade, in the order named, an oscillator-modulator 13, an intermediate-frequency amplifier 14 of one or more stages, a detector and automatic-gain-control or A. G. C. supply 15, a video-frequency amplifier 16 of one or more stages, and a cathode-ray tube image-reproducing device 17 of conventional construction provided with the usual line-frequency and field-frequency scanning windings 18 and 19, respectively, for deflecting the cathode-ray beam in two directions normal to each other. The A. G. C. supply circuit 15 is connected to the input circuits of one or more of the stages 12, 13, and 14 by a control circuit conductor 29. Connected to the output terminals of the intermediate-frequency amplifier 14 is a conventional sound-signal reproducing system 20 which comprises the usual sound intermediate-frequency amplifier, frequency detector, audio-frequency amplifier, and a loudspeaker.

The output circuit of the video-frequency amplifier 16 is coupled to the input circuit of a line-frequency periodic-voltage generator 23 and a field-frequency generator 24 through a synchronizing-signal amplifier and separator 21 and an intersynchronizing-signal separator 22. The output circuit of the field-frequency generator 24 is coupled to input terminals 70, 70 in the input circuit of a repeater or amplifier 26 including an electron tube 27 having its anode circuit coupled to the field-scanning winding 19 of the image-reproducing device 17 through a transformer 28. The output circuit of the periodic-voltage generator 23 is coupled to the line-scanning winding 18 through terminals 40, 40 and 37, 37 coupled to circuits of a generating system 25 constructed in accordance with the present invention, which generating system effectively comprises the line-frequency generator for the television receiver. Anode excitation potential for the second anode of the image-reproducing device 17 is supplied to a terminal 30 thereof from the generating system 25. The units 10–25, inclusive, with the exception of the generating system 25, which is constructed in accordance with the present invention and will be described in detail hereinafter, may be of conventional construction and operation so that a detailed description and explanation of the operation thereof are unnecessary herein.

Considering briefly, however, the general operation of the above-described receiver as a whole, signals intercepted by the antenna system 10, 11 are selected and amplified in the radio-frequency amplifier 12 and are supplied to the oscillator-modulator 13 wherein they are converted into intermediate-frequency signals. The latter, in turn, are selectively amplified in the intermediate-frequency amplifier 14 and are delivered to the detector and automatic-gain-control supply 15. The modulation components of the signal are derived by the detector of unit 15 and are supplied to the video-frequency amplifier 16 wherein they are then amplified and supplied to the input circuit of the image-reproducing device 17. A control voltage derived by the automatic-gain-control supply of unit 15 is applied by the control circuit conductor 29 as an automatic-amplification-control bias to the gain-control circuits of units 12, 13, and 14 to maintain the signal input to the detector of unit 15 within a relatively narrow range for a wide range of received signal intensities.

Unit 21 selects the synchronizing signals from the other modulation components of the composite video-frequency signal applied thereto from the video-frequency amplifier 16. The line-synchronizing and field-synchronizing signals derived by the separator 21 are separated from each other by unit 22 and are then supplied to respective ones of the generators 23 and 24 to synchronize the operation thereof. Unit 23 develops a periodic voltage for application to the generating system 25 to control the operation thereof. An electron beam is produced by the cathode-ray image-reproducing device 17 and the intensity of this beam is controlled in accordance with the video-frequency and control voltages impressed on the brilliancy-control electrode from the video-frequency amplifier 16. Saw-tooth current waves generated in the line-frequency generating system 25 and also in the field-frequency generating system including the generator 24 and the amplifier 26 are applied to the scanning windings of the unit 17 to produce scanning fields, thereby to deflect the cathode-ray beam of that unit in two directions normal to each other to trace a rectilinear scanning pattern on the screen of the tube and thereby reconstruct the translated picture.

The sound intermediate-frequency signal is applied by unit 14 to the sound-signal reproducing system 20, wherein it is amplified. The audio-frequency modulation components are derived in a conventional manner by the frequency detector of that unit and are then applied to the audio-frequency amplifier thereof for amplification and application to the loudspeaker for conversion to sound.

*Description of generating system 25 of Fig. 1*

Referring now more particularly to the portion of the Fig. 1 receiver embodying the present invention, the system 25 for generating a periodic scanning current for the line-scanning winding 18 of the cathode-ray image-reproducing device 17 comprises an essentialy inductive load circuit including an autotransformer 32 having a continuous winding comprising a plurality of winding portions 33, 34*a*, 34*b*, and 35 and including a circuit for coupling the winding 18 to the first-mentioned one of the winding portions. This last-mentioned circuit includes the electrical connections 36, 36 connected to the extremities of the winding portion 33 and a pair of terminals 37, 37 connected to the line-scanning winding 18. The generating system 25 also includes an electron-discharge device such as a tetrode 38 having control electrode-cathode input electrodes, anode-cathode output electrodes effectively coupled to the load circuit, and a screen electrode intermediate the output electrodes. The junction of the winding portions 34*b* and 35 is connected directly to the anode of the tube 38, and the extremity of the winding portion 33 remote from the aforesaid junction is coupled to the grounded cathode of the tube through an energy-storage device or condenser 39 of low impedance.

The system 25 further includes a circuit for applying to the input electrodes of the tube 38 a periodic voltage to develop the scanning current in the winding 18 when it is coupled in circuit in the manner represented. The periodic voltage-applying circuit includes the pair of terminals 40, 40 coupled to the output circuit of the generator 23 and coupled to the input electrodes of the tube 38 through a coupling condenser 41 and a grid-leak resistor 42. The system 25 for generating a periodic scanning current also includes a unidirectional voltage source coupled to the output electrodes of the tube 38 through at least some of the winding portions of the transformer 32. In particular, a source of unidirectional voltage +B is connected across the anode-cathode electrodes of the tube 38 through a rectifier device such as a diode 44, an inductor 43, and the winding portion 34*b*. A condenser 45 is connected between the cathode of the diode 44 and the junction of winding portions 33 and 34*a*. The condenser 45 forms with the inductor 43 a linearity-correcting network, more fully described in applicant's copending application, Serial No. 275,601, filed concurrently herewith, and entitled "System for Generating a Periodic Scanning Current."

The generating system 25 additionally includes a voltage-generating circuit including the source +B, a rectifier device, and at least some of the winding portions of the transformer 32 for developing during normal operation of the system a unidirectional voltage substantially higher than that of the source. This circuit, in addition to including the source +B, includes the diode 44, the inductor 43, the winding portions 34*a* and 33, and the condenser 39.

The generating system 25 also includes a circuit connecting the voltage-generating circuit, specifically, the condenser 39 thereof, to the screen electrode of the tube 38 for applying thereto a portion of the voltage developed across the condenser representative of the normal operating voltage of the screen electrode, whereby, upon failure of the voltage-generating system to generate a normal scanning current, the voltage of the screen electrode drops to an abnormally low value. This circuit comprises a voltage-divider circuit including an impedance having a resistance which increases with a decrease in the value of current flow therethrough. This impedance is preferably the repeater 26 including the tube 27 in another signal-translating path such as the field-scanning current-generating system of the television receiver. Anode-cathode electrodes of such a tube normally require an excitation potential which exceeds that of the source +B and hence is not always readily obtainable. The direct-current circuit connected to the intermediate electrode of the tube 38 includes the series combination of a decoupling resistor 47 connected to the junction of the winding 33 and the condenser 39, the primary winding of the transformer 28 which is in turn connected to the anode of the tube 27, the space-current path and an adjustable cathode resistor 49 for the tube 27, and an optional winding 53 connected to the screen electrode of the tube 38. The winding 53 is inductively coupled to the continuous winding of the transformer 32 and is arranged with such polarity as to derive for application to the screen electrode of tube 38 a voltage which during the conducting interval of tube 38 augments the voltage developed by the other elements of the voltage-divider circuit during normal operation of the generating system 25 but derives a substantially reduced or zero voltage upon failure of the system to generate a normal scanning current. By-pass condensers 48 and 51 serve to decouple the field-frequency and line-frequency systems.

The load circuit of the generating system 25 also includes a high-voltage rectifier system such as a conventional voltage-doubler circuit 55 including a pair of diode rectifier devices 56 and 57. The anodes of the diodes are connected together through a condenser 54 and are also connected to one extremity of the step-up winding 35 of the transformer 32. Auxiliary transformer windings 58 and 59 supply heater current to the filaments for the cathodes of the diodes 56 and 57 and the cathode of the latter is connected to ground through a storage condenser 60. The anode of the diode 56 is connected to the cathode of the diode 57 through a resistor 61. The cathode of the diode 56 is connected to the cathode of the diode 57 through a storage condenser 62 and to the anode terminal 30 of the image-reproducing device 17 through a protective resistor 63 and an output terminal 64.

*Explanation of operation of generator system 25 of Fig. 1*

In considering the operation of the generating system 25 of Fig. 1, it will be assumed initially that the system has been in operation for a brief interval of time to establish a cutoff bias on the control electrode of tube 38 and operating potentials across the various other portions of the system such as the storage condenser 39. Curve A of Fig. 2 represents the periodic voltage applied to the input circuit of tube 38 from the generator 23, the first interval $t_0$–$t_1$ representing the latter portion of a trace interval. During the interval $t_1$–$t_2$, hereinafter referred to as a retrace interval, the periodic voltage has a negative pulse portion of relatively large value. During the succeeding interval $t_2$–$t_3$, referred to as a trace interval, this potential increases gradually to zero, where it remains until time $t_3$ whereupon it changes abruptly to a relatively large negative value. At time $t_4$, which corresponds to the end of another retrace interval, the periodic voltage again commences to increase gradually to zero, thus forming a succeeding trace interrval.

At time $t_0$ the periodic voltage applied to the control electrode of the tube 38 exceeds its cut-off level and anode current begins to flow in the tube and increases in the manner represented by curve B. At this time the diode 44 is also conducting rather heavily and the diode current has the wave form represented by curve C. The current flowing in the line-scanning winding 18 effectively constitutes the algebraic sum of the alternating components of current flowing in the diode 44 and in the output circuit of the tetrode 38, each current being reduced to the number of turns in winding portion 33. This resultant current has a substantially saw-tooth wave form as represented by curve D of Fig. 2. At time $t_1$–$t_2$, the negative pulse portion of the periodic voltage of curve A applied to the control electrode of the tube 38 drives the tube to anode-current cutoff. At a result of this sudden interruption of anode current, the magnetic fields in the essentially inductive load circuit comprising the transformer 32 and the line-scanning winding 18 collapse and the distributed and other circuit capacitances of the load circuit permit free oscillations to take place, the free oscillation frequency being from three to four times that of the line-scanning frequency. As a result of the collapse of the magnetic field in the transformer 32, a positive voltage pulse having a nearly sinusoidal rise is momentarily induced at the various terminals of the winding above the junction of the condenser 39 and the resistor 47. The positive pulse applied to the cathode of the diode 44 exceeds that of the source +B and renders the diode nonconductive at substantially the start of the retrace interval $t_1$–$t_2$ as represented by curve C. During this interval, the current flowing in the line-scanning winding 18 decreases rapidly from a positive value to zero and then swings negative as shown by curve D. The reversal of the current flow in the line-scanning winding during the retrace interval $t_1$–$t_2$ causes the electron beam to be deflected quickly in a direction opposite to that during the preceding trace interval. The described retrace operation occurs in approximately one-half the cycle of the free oscillation frequency of the load circuit.

When the trailing edge of the positive voltage pulse developed at the junction of the winding portions 34a and 33, and hence effectively at the cathode of the diode 44, drops at approximately time $t_2$ to a value less than that of the source +B applied to the anode as in curve F, the diode again becomes conductive and initiates the start of the trace interval $t_2$–$t_3$. The current in the line-scanning winding 18 at the start of this retrace interval is negative and begins to decrease approximately linearly in the manner represented by curve D. The diode current flowing during the initial portion of the trace interval $t_2$–$t_3$ is also effective to supply energy to the storage condenser 39 and the latter assumes an average potential substantially greater than that of the source +B, this potential being represented by the broken line curve E of Fig. 2. Early in the trace interval $t_2$–$t_3$, the potential of curve A applied to the control electrode of the tube 38 is again effective to overcome the bias thereon and render that tube conductive. During the remainder of the trace interval, the currents flowing in the diode 44 and the tube 38 develop a positive-going approximately linear portion of the line-scanning current represented by curve D for deflecting the cathode-ray beam of the device 17 in the well-known manner. At time $t_3$ the negative pulse applied to the control electrode of the tube 38 suddenly renders the tube nonconductive, and during the retrace intervals $t_3$–$t_4$ the cycle of operation explained above in connection with the retrace interval $t_1$–$t_2$ is repeated.

During retrace intervals such as $t_1$–$t_2$ and $t_3$–$t_4$, large positive-voltage pulses of the type represented by curve F are developed at the junction of the voltage step-up winding portion 35 and the anode of the diode 57 in the manner previously explained. The diodes 56 and 57 of the voltage-doubler circuit 55 rectify these pulses in the well-known manner and derive across the condenser 62 a high unidirectional voltage which is delivered through the resistor 63 to the terminal 64 for application to an anode of the image-reproducing device 17.

As previously mentioned, there is developed across the condenser 39 an average unidirectional voltage of positive polarity which is substantially greater than that of the source +B, this voltage being usually about twice that of the source. The tube 38 requires a screen potential lower than that of the source +B. A portion of the voltage developed across the condenser 39 may be advantageously used for that purpose, the remainder being used in the dropping resistance comprised by the tube 27 and the resistors 47 and 49. Adjustment of the cathode resistor 49 may be advantageously employed to control the direct-current resistance of the tube 27. Neglecting for the moment the action of the winding 53 in connection with its inductive coupling to the continuous winding of the transformer 32, the voltage thus applied to the screen electrode of the tube 38 is a unidirectional voltage as represented by the dotted-line curve G of Fig. 2.

It is clear that a saving in power is accomplished by using the tube 27 in lieu of a voltage-dropping resistor because the latter would waste considerable energy in the form of heat. Since a tube such as the tube 27 in the output stage of a field-frequency generating system ordinarily requires an anode-cathode voltage exceeding that of the source +B, it is convenient to energize its anode-cathode circuit from the relatively high unidirectional voltage developed across the condenser 39. But this voltage is higher than is needed; so, from this aspect also, the series connection of the screen electrode-cathode circuit of tube 38 constitutes a saving in power. Occasionally it may become necessary to replace the tube 38 due to ordinary filament failure. Since different tubes of the same type such as the tube 38 may vary in their characteristics, they may require different screen-electrode voltages to develop the same screen-electrode current in normal operation. During such operation, it is more desirable that the screen-electrode current of tube 38 remain more nearly constant when a replacement of that tube is made. The use of the tube 27 in the voltage-generating circuit for the screen electrode of the tube 38 is advantageous since it tends to maintain the screen current of tube 38 more nearly constant when tubes are changed. The potential applied to the anode of the tube 38 is represented by the solid-line curve H.

Considering now the influence of the winding 53 with respect to the potential applied to the screen electrode of the tube 38 during the retrace intervals $t_1$—$t_2$ and $t_3$—$t_4$, the winding 53 applies a negative-polarity pulse as represented by broken-line curve I to the screen electrode. During the retrace intervals when it is desired that the tube 38 be rendered nonconductive, there are developed at the anode of that tube large amplitude positive pulses, fragmentary portions of which are represented on curve H of Fig. 2 of the drawings. The negative-polarity pulses of curve I cooperate with the corresponding pulses of curve A applied to the control electrode of the tube 38, thus assuring that it is driven to anode-current cutoff. The potential supplied by the pickup winding 53 to the screen electrode of the tube 38 during trace intervals effectively has a direct-current component which may be considered to comprise the difference between the potentials represented by the horizontal portions of curves I and G during the trace intervals. This direct-current component may be of the order of 100 volts in some applications, and thus permits a relatively large portion of the voltage developed across the condenser 39 to be supplied to the anode-cathode circuit of the tube 27 for those applications wherein that tube requires a high anode-cathode operating potential. Although the winding 53 has the advantageous effects just described, it can be omitted for reasons of simplicity, this invention not being restricted to its use.

In the event the generating system 25 fails to develop a normal scanning current, such as from the occurrence of a short circuit in the line-scanning winding, magnetic energy is no longer available in the inductive load circuit to develop across the condenser 39 a voltage which is greater than that of the source +B and the voltage across the condenser drops from that represented by curve E to that of the source, less the voltage lost in the resistances of the diode 44, the inductor 43, and portions of the transformer winding. The continuous winding of the transformer 32 no longer transfers energy to the winding 53 and the direct-current component normally supplied by that winding to the screen electrode of tube 38 disappears. Furthermore, the voltage applied by the voltage-divider circuit, including the tube 27, to the screen electrode is materially reduced so that the screen voltage drops to a very low value such as that represented by the broken-line curve K. Since the screen voltage of a tetrode such as the tube 38 primarily controls the space-current flow therein, the low screen voltage of the tube permits only a small, safe space current to flow therein under the condition just mentioned. The magnitude of the current flow is sufficiently small that the tube is not injured thereby. A similar action also takes place when a failure or a short circuit occurs in the winding portions of the transformer 32 and in the high-voltage supply system including the voltage doubler 55.

The complete or partial loss of voltage supplied by the periodic-voltage generator 23 to the input circuit of the tube 38 results in a decreased potential developed across the windings of the transformer 32 and this correspondingly affects the magnitude of the voltage developed across the condenser 39 for application to the screen electrode of the tube 38. This in turn reduces to a safe value the magnitude of the potential applied to the screen electrode of tube 38 thereby maintaining the current flow therein at a safe value.

The following circuit constants are given as illustrative values of circuit elements which may be utilized in the generating system 25 of Fig. 1:

| | |
|---|---|
| Tube 27 | Type 6SN7 |
| Tube 38 | Type 6BQ6 |
| Tube 44 | Type 6V3 |
| Resistor 42 | 470 kilohms |
| Resistor 47 | 1 kilohm |
| Resistor 49 | I kilohm (max.) |
| Condenser 39 | 8 microfarads |
| Condenser 41 | 0.01 microfarad |
| Condenser 45 | 0.022 microfarad |
| Condenser 48 | 50 microfarads |
| Condenser 51 | 10 microfarads |
| Transformer 32: | |
| Winding portion 33 | 300 turns #34 single silk enamel wire |
| Winding portion 34*a*, 34*b* each. | 80 turns #34 single silk enamel wire |
| Winding portion 35 | 240 turns #34 single silk enamel wire |
| Winding 53 | 50 turns #34 single silk enamel wire |
| Inductor 43 and winding 18, each. | 30 millihenries |
| +B | 220 volts |
| Input voltage to tube 38 | 100 volts peak-to-peak |
| Screen electrode voltage tube 38 | 130 volts average |
| D. C. component contributed by winding 53. | approximately 50 volts |
| Anode-cathode voltage of tube 27. | approximately 310 volts |
| Line-scanning frequency | 15,750 cycles per second |

From the foregoing description, it will be clear that a generating system in accordance with the present invention is self-protecting in the event of abnormal conditions such as the partial or complete loss of drive voltage therefor or in the event of short circuits occurring in the transformer winding and the scanning winding associated therewith.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for generating a periodic scanning current for a scanning winding of a cathode-ray tube comprising: an essentially inductive load circuit including an autotransformer having a continuous winding comprising a plurality of winding portions and including a circuit for coupling a scanning winding to one of said winding portions; a tetrode having input electrodes, output electrodes effectively coupled to said load circuit, and an electrode intermediate said output electrodes; a condenser of low impedance connected to said output electrodes through said continuous winding; a circuit for applying to said input electrodes a periodic voltage to develop said scanning current in the scanning winding when it is coupled to said load circuit; a unidirectional voltage source and a diode connected to said output electrodes through one of said winding portions remote from said condenser; a voltage-generating circuit including said source, said diode, one of said winding portions, and said condenser for developing thereacross during normal operation of said system a unidirectional voltage substantially higher than that of said source; and a circuit, including an electron-tube repeater having anode-cathode electrodes in one signal-translating path and serially connected in said last-mentioned circuit and normally requiring across said anode-cathode electrodes a voltage exceeding that of said source, connecting said condenser to said intermediate electrode for applying thereto a portion of said developed voltage representative of the normal voltage of said intermediate electrode, whereby, upon failure of said system to generate a normal scanning current, the voltage of said intermediate electrode drops to an abnormally low value.

2. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a circuit for applying to said input electrodes a periodic voltage to develop said scanning current in the scanning winding when it is coupled to said load circuit; a unidirectional voltage source coupled to said output electrodes through at least some of said winding portions; a voltage-generating circuit including said source, a rectifier device, and at least some of said winding portions for developing during normal operation of said system a unidirectional voltage substantially higher than that of said source; and a circuit connecting said voltage-generating circuit to said intermediate electrode for applying thereto a portion of said developed voltage representative of the normal voltage of said intermediate electrode, whereby, upon failure of said system to generate a normal scanning current, the voltage of said intermediate electrode drops to an abnormally low value.

3. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a circuit for applying to said input electrodes a periodic voltage to develop said scanning current in the scanning winding when it is coupled to said load circuit; a unidirectional voltage source coupled to said output electrodes through at least some of said winding portions; a voltage-generating circuit including said source, a rectifier device, and at least some of said winding portions for developing during normal operation of said system a unidirectional voltage substantially higher than that of said source; and a circuit including an impedance having a resistance which increases with a decrease in the current flow therethrough connecting said voltage-generating circuit to said intermediate electrode for applying thereto a portion of said developed voltage representative of the normal voltage of said intermediate electrode, whereby, upon failure of said system to generate a normal scanning current, the voltage of said intermediate electrode drops to an abnormally low value.

4. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a circuit for applying to said input electrodes a periodic voltage to develop said scanning current in the scanning winding when it is coupled to said load circuit; a unidirectional voltage source coupled to said output electrodes through at least some of said winding portions; a voltage-generating circuit including said source, a rectifier device, and at least some of said winding portions for developing during normal operation of said system a unidirectional voltage substantially higher than that of said source; and a circuit, including an electron-discharge device having electrodes serially connected in said last-mentioned circuit and normally requiring the application to said electrodes thereof of a voltage exceeding that of said source, connecting said voltage-generating circuit to said intermediate electrode for applying thereto a portion of said developed voltage representative of the normal voltage of said intermediate electrode, whereby, upon failure of said system to generate a normal scanning current, the voltage of said intermediate electrode drops to an abnormally low value.

5. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a circuit for applying to said input electrodes a periodic voltage to develop said scanning current in the scanning winding when it is coupled to said load circuit; a unidirectional voltage source coupled to said output electrodes through at least some of said winding portions; a voltage-generating circuit including said source, a rectifier device, and at least some of said winding portions for developing during normal operation of said system a unidirectional voltage substantially higher than that of said source; and a circuit, including an electron-discharge device having output electrodes in one signal-translating path and serially connected in said last-mentioned circuit and normally requiring across said output electrodes a voltage exceeding that of said source, connecting said voltage-generating circuit to said intermediate electrode for applying thereto a portion of said developed voltage representative of the normal voltage of said intermediate electrode, whereby, upon failure of said system to generate a normal scanning current, the voltage of said intermediate electrode drops to an abnormally low value.

6. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a circuit for applying to said input electrodes a periodic voltage to develop said scanning current in the scanning winding when it is coupled to said load circuit; a unidirectional voltage source coupled to said output electrodes through at least some of said winding portions; a voltage-generating circuit including said source, a rectifier device, and at least some of said winding portions for developing during normal operation of said system a unidirectional voltage substantially higher than that of said source; and a circuit, including an electron-tube repeater having anode-cathode electrodes in one signal-translating path and serially connected in said last-mentioned circuit and normally requiring across said anode-cathode electrodes a voltage exceeding that of said source, connecting said voltage-generating circuit to said intermediate electrode for applying thereto a portion of said developed voltage representative of the normal voltage of said intermediate electrode, whereby, upon failure of said system to generate a normal scanning current, the voltage of said intermediate electrode drops to an abnormally low value.

7. A system for generating a periodic scanning current for a scanning winding of a cathode-ray tube comprising: an essentially inductive load circuit including an autotransformer having a continuous winding comprising a plurality of winding portions and including a scanning winding coupled to at least one of said winding portions; an electron-discharge device having input electrodes, output electrodes effectively coupled to said load circuit, and an electrode intermediate said output electrodes; a circuit for applying to said input electrodes a periodic voltage to develop said scanning current in the scanning winding; a unidirectional voltage source coupled to said output electrodes through at least some of said winding portions; a voltage-generating circuit including said source, a rectifier device, and at least some of said winding portions for developing during normal operation of said system a unidirectional voltage substantially higher than that of said source; and a circuit connecting said generating circuit to said intermediate electrode for applying thereto a portion of said developed voltage representative of the normal voltage of said intermediate electrode, whereby, upon failure of said system to generate a normal scanning current, the voltage of said intermediate electrode drops to an abnormally low value.

8. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a circuit for applying to said input electrodes a periodic voltage to develop said scanning current in the scanning winding when it is coupled to said load circuit; a unidirectional voltage source coupled to said output electrodes through at least some of said winding portions; a voltage-generating circuit including said source, a rectifier device, said at least one winding portion, and an energy-storage device for developing across said energy-storage device during normal operation of said system a unidirectional voltage substantially higher than that of said source; and a circuit connecting said voltage-generating circuit to said intermediate electrode for applying thereto a portion of said developed voltage representative of the normal voltage of said intermediate electrode, whereby, upon failure of said system to generate a normal scanning current, the voltage of said intermediate electrode drops to an abnormally low value.

9. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a condenser connected to said output electrodes through at least some of said winding portions; a circuit for applying to said input electrodes a periodic voltage to develop said scanning current in the scanning winding when it is coupled to said load circuit; a unidirectional voltage source coupled to said output electrodes through one of said winding portions remote from said condenser; a voltage-generating circuit including said source, a rectifier device, said condenser, and at least some of said winding portions for developing across said condenser during normal operation of said system a unidirectional voltage substantially higher than that of said source; and a circuit connecting said condenser to said intermediate electrode for applying thereto a portion of said developed voltage representative of the normal voltage of said intermediate electrode, whereby, upon failure of said system to generate a normal scanning current, the voltage of said intermediate electrode drops to an abnormally low value.

10. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a condenser connected to said ouput electrodes through at least some of said winding portions; a circuit for applying to said input electrodes a periodic voltage to develop said scanning current in the scanning winding when it is coupled to said load circuit; a unidirectional voltage source and a rectifier device connected to said output electrodes through one of said winding portions remote from said condenser; a voltage-generating circuit including said source, said rectifier device, at least some of said winding portions, and said condenser for developing thereacross during normal operation of said system a unidirectional voltage substantally higher than that of said source; and a circuit connecting said condenser to said intermediate electrode for applying thereto a portion of said developed voltage representative of the normal voltage of said intermediate electrode, whereby, upon failure of said system to generate a normal scanning current, the voltage of said intermediate electrode falls to an abnormally low value.

11. A system for generating a periodic scanning current for a scanning winding of a cathode-ray tube comprising: an essentially inductive load circuit including an autotransformer having a continuous winding comprising a plurality of winding portions and including a circuit for coupling a scanning winding to one of said winding portions; an electron-discharge device having input electrodes, output electrodes effectively coupled to said load circuit, and an electrode intermediate said output electrodes; a condenser connected to said output electrodes through at least some of said winding portions; a circuit for applying to said input electrodes a periodic voltage to develop said scanning current in the scanning winding when it is coupled to said load circuit; a unidirectional voltage source and a rectifier device connected to said output electrodes through one of said winding portions remote from said condenser; a voltage-generating circuit including said source, said rectifier device, one winding portion, and said condenser for developing thereacross during normal operation of said system a unidirectional voltage substantially higher than that of said source; and a circuit connecting said condenser to said intermediate electrode for applying thereto a portion of said developed voltage representative of the normal voltage of said intermediate electrode, whereby, upon failure of said system to generate a normal scanning current, the voltage of said intermediate electrode drops to an abnormally low value.

12. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a circuit for applying to said input electrodes a periodic voltage to develop said scanning current in the scanning winding when it is coupled to said load circuit; a unidirectional voltage source coupled to said output electrodes through at least some of said winding portions; a voltage-generating circuit including said source, a rectifier device, and at least some of said winding portions for developing during normal operation of said system a unidirectional voltage substantially higher than that of said source; a circuit connecting said voltage-generating circuit to said intermediate electrode for applying thereto a portion of said developed voltage representative of the normal voltage of said intermediate electrode, whereby, upon failure of said system to generate a normal scanning current, the voltage of said intermediate electrode drops to an abnormally low value; and a circuit element included in said last-mentioned circuit and coupled to said continuous winding for deriving a voltage which augments said portion of said developed voltage during said normal operation but has a substantially reduced value upon said failure.

13. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a circuit for applying to said input electrodes a periodic voltage to develop said scanning current in the scanning winding when it is coupled to said load circuit; a unidirectional voltage source coupled to said output electrodes through at least some of said winding portions; a voltage-generating circuit including said source, a rectifier device, and at least some of said winding portions for developing during normal operation of said system a unidirectional voltage substantially higher than that of said source; a circuit connecting said voltage-generating circuit to said intermediate electrode for applying thereto a portion of said developed voltage representative of the normal voltage of said intermediate electrode, whereby, upon failure of said system to generate a normal scanning current, the voltage of said intermediate electrode drops to an abnormally low value; and a winding included in said last-mentioned circuit and inductively coupled to said continuous winding for deriving a voltage which augments said portion of said developed voltage during said normal operation but has a substantially reduced value upon said failure.

14. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a circuit for applying to said input electrodes a periodic voltage to develop said scanning current in the scanning winding when it is coupled to said load circuit; a unidirectional voltage source coupled to said output electrodes through at least some of said winding portions; a voltage-generating circuit including said source, a rectifier device, and at least some of said winding portions for developing during normal operation of said system a unidirectional voltage substantially higher than that of said source; a circuit including an impedance having a resistance which increases with a decrease in the current flow therethrough connecting said voltage-generating circuit to said intermediate electrode for applying thereto a portion of said developed voltage representative of the normal voltage of said intermediate electrode, whereby, upon failure of said system to generate a normal scanning current, the voltage of said intermediate electrode drops to an abnormally low value; and a circuit element connected in series relation with said impedance in said last-mentioned circuit and coupled to said continuous winding for deriving a voltage which augments said portion of said developed voltage during said normal operation but has a substantially reduced value upon said failure.

15. A system for generating a periodic scanning current for a scanning winding of a cathode-ray tube comprising: an essentially inductive load circuit including an autotransformer having a continuous winding comprising a plurality of winding portions and including a circuit for coupling a scanning winding to at least one of said winding portions; an electron-discharge device having input electrodes, output electrodes effectively coupled to said load circuit, and an electrode intermediate said output electrodes; a circuit for applying to said input electrodes a periodic voltage to develop said scanning current in the scanning winding when it is coupled to said load circuit; a unidirectional voltage source coupled to said output electrodes through at least some of said winding portions; a voltage-generating circuit including said source, a rectifier device, and at least some of said winding portions for developing during normal operation of said system a unidirectional voltage substantially higher than that of said source; a circuit, including an electron-discharge device having output electrodes in one signal-translating path and serially connected in said last-mentioned circuit and normally requiring across said output electrodes a voltage exceeding that of said source, connecting said voltage-generating circuit to said intermediate electrode for applying thereto a portion of said developed voltage representative of the normal voltage of said intermediate electrode, whereby, upon failure of said system to generate a normal scanning current, the voltage of said intermediate electrode drops to an abnormally low value; and a winding included in said circuit to said intermediate electrode and inductively coupled with such polarity to said continuous winding as to derive and apply to said intermediate electrode during retrace intervals of said scanning current a negative polarity signal and to apply thereto an average voltage which augments said portion of said developed voltage during said normal operation but has a substantially reduced value upon said failure.

ALAN HAZELTINE.

References Cited in the file of this patent

UNITED STATES PATENTS

| Number | Name | Date |
|---|---|---|
| 2,261,776 | Foch | Nov. 4, 1941 |
| 2,444,902 | Torsch | July 6, 1948 |
| 2,536,839 | Clark et al. | Jan. 2, 1951 |
| 2,536,857 | Schade | Jan. 2, 1951 |
| 2,543,719 | Clark | Feb. 27, 1951 |
| 2,543,720 | Hoyt | Feb. 27, 1951 |
| 2,566,510 | Barco | Sept. 4, 1951 |
| 2,588,659 | Pond | Mar. 11, 1952 |
| 2,611,106 | Fyler et al. | Sept. 15, 1952 |